3,015,631
POLYMERIZATION ACTIVATOR
Chester M. McCloskey, 1981 Sinaloa Ave.,
Altadena, Calif.
No Drawing. Filed Sept. 21, 1956, Ser. No. 611,387
7 Claims. (Cl. 252—426)

This invention relates to improved initiators for the polymerization of ethylenically unsaturated organic compounds (resinophors) and to processes of polymerization.

An object of this invention is to provide improved and efficient initiators for the polymerization of ethylenically unsaturated resinophors.

Another object of this invention is to provide liquid nonhazardous initiators for the polymerization of ethylenically unsaturated resinophors.

Another object of this invention is to provide a liquid initiator of increased activity for the polymerization of ethylenically unsaturated resinophors.

Another object of this invention is to provide an improved process for the preparation of liquid polymerization initiators composed primarily of methyl ethyl ketone peroxide.

Another object of this invention is to provide improved processes for the polymerization of ethylenically unsaturated resinophors.

At present, initiation of the polymerization of ethylenically unsaturated resinophors can be accomplished by several types of initiating agents or initiators, sometimes called catalysts. The particular type of initiator selected usually depends on the particular resinophor to be polymerized and on the conditions to be employed. Such initiators often contain a peroxyl radical as an essential part of their structure. A peroxyl radical as used herein is one in which two oxygen atoms are joined together in series and terminate in either a hydrogen or carbon atom. Where one terminal atom is a hydrogen atom, the term hydroperoxyl or hydroperoxide is sometimes used. The term resinophor is used herein to refer only to those ethylenically unsaturated organic compounds susceptible to free radical initiated polymerization.

One type of initiator containing the peroxyl radical is the organic hydroxy peroxide in which the hydroxyl and peroxyl radicals reside on the same carbon atom. Peroxides of this type are commonly known as aldehyde or ketone peroxides and have been used extensively for the polymerization of ethylenically unsaturated resinophoric compounds. The hydroxy-peroxides are particularly useful in the initiation of the polymerization of the ethylenically unsaturated polyesterstyrene resins at low temperatures. This is facilitated by the high degree of acceleration of the decomposition of the hydroxy-peroxides by cobalt naphthenate and other activators and promoters at low temperatures. The degree of acceleration is unique with this type of accelerator and permits the rapid polymerization of resinophors at room temperature. Although efficient initiators, the lower molecular weight hydroxy-peroxides have a high active oxygen content and are hazardous to prepare and use. As a result, these compounds are often marketed as a solution or suspension in a high boiling liquid such as dimethyl phthalate. This serves to phlegmatize them and reduce the vigor of burning in the event of accidental ignition.

The hydroxy-peroxides are commonly prepared by the reaction of an aldehyde or ketone with hydrogen peroxide often in the presence of an acid catalyst to accelerate the reaction. While the product is usually spoken of as hydroxy-hydroperoxide, the product is more often a dimer formed by the removal of the elements of water from two hydroxy-hydroperoxide molecules. In actual practice the marketed product usually consists of a mixture of several compounds and in solution probably exists as an equilibrium.

The hydroxy-peroxides vary considerably in physical and initiator properties. As a result individual members have found varying degrees of usefulness in the plastics industry.

An ideal initiator should be a liquid to facilitate incorporation into the resinophor system and give uniform distribution. It should be active as an initiator but giving the resin an adequate potlife with a controllable gel and cure rate and a minimum of side effects. It should be economical and possess a minimum of hazard from fire and detonation. No peroxide type initiator at present meets all the qualifications of an ideal initiator. However, the hydroxy-peroxide derived from methyl ethyl ketone commonly known as methyl ethyl ketone peroxide (2-hydroxybutyl-2-peroxides) is one of the most useful. It is marketed as a 60% solution in a phlegmatizer, usually dimethyl phthalate. As such it is a liquid, with good activity as an intiator, a flash point in the neighborhood of 110°–120° F. and burns extremely vigorously when ignited. It has a high active oxygen content and cannot be safely employed in concentrations above 60%. Another hydroxy-peroxide system, cyclohexanone peroxide (1-hydroxycyclohexyl-1 peroxides) also has good activity but is a solid and difficult to use. Unphlegmatized its use is semi-hazardous but as a 60% paste it is reasonably safe. It is only slightly soluble in the common plegmatizing agents in which it is stable. However, it has sufficient solubility to promote crystal growth in pastes and as a result the pastes have poor storage stability.

The instant invention involves the discovery that cyclohexanone peroxide (1-hydroxycyclohexyl-1 peroxides) acts synergistically with methyl ethyl ketone peroxide (2-hydroxybutyl-2 peroxides) when substituted for the latter to an extent of less than 40%. Such substitution simultaneously decreases the active oxygen content and lowers the fire and detonation hazard at no reduction in storage stability.

The process comprising the simultaneous homogeneous preparation of the initiator system of the instant invention was found to be an improvement over the preparation of methyl ethyl ketone peroxide alone. Greatly improved yields of organic peroxides were obtained permitting a lower hazard in the process by the use of lower concentrations of hydrogen peroxide, also obtained were a greater ease of purification and a lower water solubility. The synergistic action of cyclohexanone peroxide with methyl ethyl ketone peroxide permits the substitution of the former for the latter with an increase of activity at the same organic peroxide content. The initiator of the instant invention as compared to methyl ethyl ketone peroxide at the same organic peroxide content has the advantages of increased activity, lower oxygen content, greater stability to detonation and a higher flash point. Similarly the product as compared to cyclohexanone peroxide has the advantage of greater activity and a liquid state. That the storage stability of the initiator was found to be good was fortunate since cyclohexanone peroxide has good storage stability in very few organic compounds.

The ratio in which methyl ethyl ketone peroxide and cyclohexanone peroxide have been found to be most effective is in a weight ratio of 3–2 or less. Concentrations above this range result in crystallization at lower temperatures and are difficult to maintain homogeneous. Optimum initiator activity was found to vary somewhat with the particular resinophor system but generally fell between the ratios of 2–1 and 10–1.

The individual peroxides can be combined after separate preparations or they can be prepared homogeneously together. Since the individual peroxides are complex, the structure of the mixture is not known or to what extent interaction takes place. However, an initiator in which the components were prepared homogeneously was found to have a higher activity and less tendency to crystallize than a preparation of similar composition and active oxygen content from individual components. Simultaneous preparation of the initiator is preferred.

From safety considerations, it is desirable with the initiator of the instant invention as with all organic peroxides of high active oxygen content, to employ a phlegmatizer. While a lower concentration of phlegmatizer can be safely employed than that commonly used with methyl ethyl ketone peroxide (e.g. 40%), peroxide materials in general are sufficiently hazardous that the increased safety is often preferable to increased activity. The selection of the phlegmatizer is not specific and those phlegmatizers that have been used with methyl ethyl ketone peroxide and similar systems are suitable. From considerations of availability, cost and long term stability the phthalate esters were found to be particularly good. A high boiling point is desirable in order to minimize the hazard from fire. Where it is desirable that the initiator maintain its activity over long storage periods it is preferable that the phlegmatizer not have an active hydrogen atom or if an ester an alpha hydrogen atom. Phosphate esters also have been found unsuitable for long storage periods. However aryl tertiary hydroperoxides are suitable.

While the initiator system of the instant invention is particularly useful at low temperatures, it has also been found to be efficient at elevated temperatures and is readily activated by heat. For room temperature polymerization, the time for curing can be reduced by the use of activators or promoters. The promoters that have been found to be effective are those normally employed with the hydroxy-peroxides. Such promoters are cobalt naphthenate, ferric benzoate and manganese octoate.

While initiators of the present invention are especially effective in the polymerization of those resinophors commonly called styrene-polyester resins, they are also effective in the polymerization of all resinophors that are normally polymerized by the hydroxy-peroxides alone. The polymerization of resinophors such as methyl methacrylate, 2,4-dichlorostyrene, ethyl acrylate, vinyl acetate, acrylonitrile, p-methylstyrene, allyl acetate, and resins prepared from alkyd resins containing maleic, fumaric or itaconic acids as constituents with one of the above resinophors also was found to be effectively initiated by the present invention. A typical resin of this class would be 70 parts of alkyd resin prepared from ethylene glycol and equal parts of phthalic anhydride and maleic anhydride together with 30 parts of styrene containing 0.008% of tertiary-butylcatechol.

A number of commercial resins such as Laminac 4116, Selectron 5081 and Marco 28–C have been found to be effectively initiated by the synergistic system of this invention.

EXAMPLE 1

A resin prepared from 65 parts of an alkyd resin (77 parts propylene glycol 90 parts of phthalic anhydride, and 40 parts of maleic anhydride) and 35 parts of styrene together with 0.004 part of hydroquinone and 0.02 part of cobalt as cobalt naphthenate was initiated at 84° F. as follows:

| Initiator [1] | Active oxygen | Gel time—Initiator Concentration | |
|---|---|---|---|
| | | 1% | 2% |
| | Percent | Min. | Min. |
| 1-Hydroxycyclohexyl-1 peroxides | 7.8 | 20 | 10 |
| 2-Hydroxybutyl-2 peroxides | 11.0 | 20.2 | 9.3 |
| ([2]) | 10.2 | 16.5 | 8.6 |
| ([3]) | 10.2 | 18.2 | 9.0 |

[1] 60% organic peroxide in dimethyl phthalate.
[2] Homogeneously prepared: 1 part 1-hydroxycyclohexyl-1 peroxides and 3 parts 2-hydroxybutyl-2 peroxides.
[3] Same as #2, individually prepared.

EXAMPLE 2

The resin of Example 1 gave the following gel times at 70°.

| Initiator [1] | Gel time and Initiator Concentration | |
|---|---|---|
| | 1% | 2% |
| | Min. | Min. |
| 2-Hydroxybutyl-2 peroxides | 46 | 21.5 |
| 1-Hydroxycyclohexy-1 peroxides, 1 pt. 2-Hydroxybutyl-2 peroxides, 3 pt. | [2] 30.5 | 16.5 |

[1] 60% organic peroxide in dimethyl phthalate.
[2] Homogeneously prepared.

EXAMPLE 3

The resin of Example 1 except using 0.003 part of cobalt gave gel times as follows at 75° F.:

Iinitiator [1]: Gel time, min.
  1% 2-hydroxybutyl-2 peroxides _____ 185
  ([2]) _____ 145
  ([3]) _____ 117

[1] 60% organic peroxide in dimethyl phthalate
[2] Individual preparations: 1 part 1-hydroxycyclohexyl-1 peroxides and 3 parts 2-hydroxybutyl-2 peroxides.
[3] Same as #2 homogeneously prepared.

EXAMPLE 4

The resin of Example 1 gave the following gel times with a 1% initiator concentration at 88° F.:

| Initiator [1] Composition, percent | | Gel time |
|---|---|---|
| A | B | |
| 100 | 0 | 19 min., 35 sec. |
| 95 | 5 | 19 min., 30 sec. |
| 91.7 | 8.3 | 17 min., 45 sec. |
| 87.5 | 12.5 | 17 min., 40 sec. |
| 75 | 25 | 15 min., 40 sec. |
| 70 | 30 | 15 min., 20 sec. |
| 65 | 35 | 15 min., 40 sec. |

[1] 60% organic peroxides in dimethyl phthalate homogeneously prepared.
  A. 2-hydroxybutyl-2 peroxides.
  B. 1-hydroxycyclohexyl-1 peroxides.

EXAMPLE 5

A mixture of 75 g. of methyl ethyl ketone, 20 g. of cyclohexanone, 70 g. of dimethyl phthalate, 200 g. of 35% hydrogen peroxide and 10 ml. of hydrochloric acid were mixed vigorously for 45 minutes and allowed to separate. The organic layer was washed with water (⅓ volume) and the organic phase stripped of water and unreacted methyl ethyl ketone under reduced pressure.

Yield, 167 g., organic peroxide content 59.8%, active oxygen content 10.25%.

EXAMPLE 6

The procedure of Example 5 except using 95 g. of methyl ethyl ketone and no cyclohexanone. Yield of product 138 g., organic peroxide content 52.2%, active oxygen content 9.56%.

EXAMPLE 7

The initiator system of Example 5 was subjected to the action of a No. 6 blasting cap. The material did not detonate nor ignite but was scattered around the test area.

EXAMPLE 8

The open cup flash point of the initiator system of Example 5 was found to compare with 60% 2-hydroxybutyl-2 peroxides in dimethyl phthalate as follows:

| Initiator: | Flash point, °F. |
|---|---|
| Initiator system of Example 5 | 168 |
| 2-hydroxybutyl-2 peroxide system | 110 |

EXAMPLE 9

The following initiators were heated at 100° F. for 100 days, then the gel time determined with the resin system of Example 1.

| Initiator: | Gel time, min. |
|---|---|
| Initiator of Example 5 | 42 |
| Same individually prepared | 33 |
| 60% 2-hydroxybutyl-2 peroxides in dimethyl phthalate | 38 |
| Same not heated | 31.5 |

EXAMPLE 10

One percent of the initiator system of Example 5 was heated at 160° F. with the following monomers:

| Monomer: | Gel time |
|---|---|
| Methyl methacrylate | 1 hr., 5 min. |
| Methyl acrylate | 45 min. |
| Styrene | 9 hr. |
| p-Methylstyrene | 10 hr., 30 min. |
| Resin of Example 1 | 12 min. |

I claim:

1. An initiator for the polymerization of ethylenically unsaturated resinophors comprising the product formed by the reaction of a mixture of methyl ethyl ketone and cyclohexanone, the ratio by weight of methyl ethyl ketone to cyclohexanone being between approximately 3 to 2 and 19 to 1, with hydrogen peroxide.

2. The initiator of claim 1 in which the ratio by weight of methyl ethyl ketone to cyclohexanone is between 2 to 1 and 10 to 1.

3. An initiator for the polymerization of ethylenically unsaturated resinophors comprising the product formed by the reaction of a mixture of methyl ethyl ketone and cyclohexanone, the ratio by weight of methyl ethyl ketone to cyclohexanone being between approximately 3 to 2 and 19 to 1 with hydrogen peroxide; and a phlegmatizing agent.

4. The initiator of claim 3 in which the ratio by weight of methyl ethyl ketone to cyclohexanone is between 2 to 1 and 10 to 1.

5. The initiator of claim 4 in which the phlegmatizing agent is a phthalate ester.

6. The process of preparation of a methyl ethyl ketone peroxide base initiator for the polymerization of ethylenically unsaturated resinophors comprising simultaneously reacting methyl ethyl ketone and cyclohexanone, the concentration of methyl ethyl ketone being between 60% and 95% of the total ketone present, with hydrogen peroxide.

7. The process of claim 6 in which the concentration of methyl ethyl ketone is between 67% and 90% of the total ketone present.

References Cited in the file of this patent

UNITED STATES PATENTS

| 2,109,595 | Marks | Mar. 1, 1938 |
|---|---|---|
| 2,136,167 | Higgins | Nov. 8, 1938 |
| 2,496,864 | Fiedler et al. | Feb. 7, 1950 |
| 2,525,628 | Young | Oct. 10, 1950 |
| 2,534,120 | Glick | Dec. 12, 1950 |
| 2,537,375 | Simons et al. | Jan. 9, 1951 |
| 2,566,206 | Hyman | Aug. 28, 1951 |
| 2,658,057 | Park | Nov. 3, 1953 |
| 2,750,421 | Halbig | June 12, 1956 |
| 2,779,702 | Wilson | Jan. 29, 1957 |
| 2,818,437 | Wildi | Dec. 31, 1957 |

OTHER REFERENCES

Schildknecht et al.: "High Polymers," vol. X, page 11, Interscience Pub. Inc. (1956).

Tobolsky et al.: "Organic Peroxides," page 45, Interscience Publ. Inc. (1954).